United States Patent [19]

Bangerter et al.

[11] Patent Number: 4,603,329
[45] Date of Patent: Jul. 29, 1986

[54] DEVICE AND METHOD FOR SENSING THE PRESENCE OR ABSENCE OF NEWLY FORMED PARTS IN CONJUNCTION WITH PARTS FORMING EQUIPMENT

[75] Inventors: Fred F. Bangerter, Brentwood; Bernard Anscher, Woodbury, both of N.Y.

[73] Assignee: National Molding Corporation, Farmingdale, N.Y.

[21] Appl. No.: 541,241

[22] Filed: Oct. 12, 1983

[51] Int. Cl.⁴ .............................................. G08B 21/00
[52] U.S. Cl. ........................................ 340/679; 72/26; 250/223 R; 340/674; 425/137
[58] Field of Search ................ 340/679, 674; 425/137, 425/139, 165, 169; 192/125 A; 198/857, 460; 250/223 R; 72/6, 21, 26

[56] References Cited

U.S. PATENT DOCUMENTS

| | | | |
|---|---|---|---|
| 2,317,839 | 4/1943 | Westin | 425/137 |
| 2,611,017 | 9/1952 | Bailey | 340/679 X |
| 3,303,537 | 2/1967 | Mislan | 425/137 X |
| 3,642,401 | 2/1972 | Wilson | 425/137 |
| 3,677,680 | 7/1972 | Etherington | 425/169 X |
| 3,878,745 | 4/1975 | Handziak et al. | 192/125 A X |
| 4,134,486 | 1/1979 | Grone | 198/857 X |
| 4,187,267 | 2/1980 | Fisher et al. | 425/137 X |
| 4,236,181 | 11/1980 | Shibata et al. | 425/137 X |
| 4,310,153 | 1/1982 | Kikuchi | 340/674 X |
| 4,363,032 | 12/1982 | Kimoto | 340/679 |
| 4,377,743 | 3/1983 | Bolt et al. | 250/223 R |
| 4,399,431 | 8/1983 | Satomi et al. | 340/679 X |
| 4,412,798 | 11/1983 | Avellino et al. | 425/137 |
| 4,421,467 | 12/1983 | Richmond | 425/169 X |

FOREIGN PATENT DOCUMENTS

| | | | |
|---|---|---|---|
| 239625 | 7/1962 | Australia | 425/139 |
| 78183 | 12/1970 | Fed. Rep. of Germany | 425/137 |
| 45-34714 | 11/1970 | Japan | 425/137 |
| 46-02906 | 1/1971 | Japan | 425/137 |

Primary Examiner—Glen R. Swann, III
Assistant Examiner—Thomas J. Mullen, Jr.
Attorney, Agent, or Firm—Kenyon & Kenyon

[57] ABSTRACT

A parts sensing device for use in the operation of parts forming equipment to sense the presence or absence of parts, the parts sensing device comprising at least one optoelectronic sensor positioned to sense the presence or absence of at least one newly formed part, operably coupled to a control means which determines at least one of whether all parts have been sensed as present and whether all parts have been sensed as absent.

55 Claims, 5 Drawing Figures

Fig. 2. Multiplexer And Remote Indicator Panel

Fig. 3. Photoreflective Sensor, Connector And Sense Circuit

Fig. 5.
INDICATOR AND OUTPUT DRIVE CIRCUIT

Fig. 4.
ALL-ON and ALL-OFF LOGIC CIRCUITS

DEVICE AND METHOD FOR SENSING THE PRESENCE OR ABSENCE OF NEWLY FORMED PARTS IN CONJUNCTION WITH PARTS FORMING EQUIPMENT

BACKGROUND OF THE INVENTION

This invention relates to a novel parts sensing device and method for use in conjunction with the operation of parts forming equipment in sensing the presence and/or absence of newly formed parts.

Parts forming equipment, various types of which utilize methods including injection molding, die casting, stamping and deep-drawing or forging press, has in recent years become increasingly automated. This equipment usually operates with a cyclical procedure, repeating the same set of operations each time a part or set of parts is formed. Working cosely with or as a part of the parts forming equipment there is usually engaged an extractor apparatus which has some means of gripping the newly formed parts, removing them from the mold, die or other similar tooling of the parts forming equipment and depositing the parts with whatever means will continue the parts preparation or packaging operation. Although some parts forming equipment is designed to eject the newly formed parts without a distinct extractor apparatus, in all cases it is imperative in order to prevent damage to the dies, molds or other similar tooling of the parts forming equipment that all newly formed parts be completely removed from the molds or dies before the next cycle in the parts forming operation begins. Inasmuch as an increasing proportion of the parts forming equipment in use is automated (without human operators), the safe and economical operation of the equipment calls for the implementation of a sensing device which, also working automatically, can accurately monitor the removal of the newly formed parts from the molds or dies.

Sensing devices for parts forming equipment are still in the early stages of development. The most commonly used methods incorporate air or vacuum sensing systems into the parts extractor apparatus used with the parts forming equipment. The sensing systems are coupled with suction cups that "grip" the parts to be removed. This type of system, however, is subject to several significant drawbacks. First, these systems are limited in the number of parts, especially small parts, that can be sensed. Secondly, the systems require the use and maintenance of air and vacuum systems. Further, with the reciprocating action and movement of the robot extractors and the vibration which accompanies such movement, leaks almost inevitably occur in the system. Owing to the nature of the system the leaks are very difficult to locate. And too, the vacuum system, although having the capacity to sense that all parts have been picked up by the extractor does not have the capacity to sense that each part has been released from the extractor means.

Another method is the application of an optoelectric system using fibre-optic sensors which are attached to the extractor apparatus of the parts forming equipment. These systems, too, have proven to be unsatisfactory. The many movements and degrees of freedom of motion in the extractor robots lead to frequent failures in the systems. The delicate fibre-optics are unable to withstand the almost incessant flexing, vibration and shock movements of the robotic arms and early failures of the fibre-optic sensors occur. Moreover, the fibre-optic sensors for such uses are relatively expensive to replace.

A third method of sensing newly formed parts in conjunction with parts forming equipment is through the use of television cameras. In such a system, a television camera is used to scan the mold or die of the parts forming apparatus, the camera signal is then read to determine whether parts are still present in the mold or die. If a part is "stuck" in the mold or die an appropriate "stop" signal is sent to the parts forming apparatus. In addition to being an expensive method of sensing (from the standpoint of high initial investment), this system is subject to other disadvantages as well. The television camera must be mounted at some position outside the immediate area of the mold or die and it views the mold base or die at an angle. The television camera field of view thereby limits the size or shape of the mold base that can be used and therefore the number of parts that can be sensed. This is remedied only by the economically undesirable and space demanding option of incorporating additional television cameras and control mechanisms. Furthermore, such systems are relatively inflexible due to the fact that to change the number, location or shape of the parts being detected may require not only repositioning of the camera but reprogramming the means which reads the camera signal so that it "detects" the new arrangement of parts.

None of the parts sensing methods in current use has proven to be a satisfactory solution to the multi-dimensional needs of the parts forming industries.

Accordingly, it is an object of the present invention to provide a relatively inexpensive yet highly reliable parts sensing device for sensing the presence and/or absence of parts in conjunction with the operation of parts forming equipment.

Another object of the present invention is to provide a parts sensing device which monitors the presence and/or absence of a relatively large number of parts, makes a determinaton that all parts have been sensed as present or absent and communicates signals representing these determinations to either an indicator means or the controller of the parts forming equipment.

Another object of the present invention is to provide a parts sensing device which uses logic circuits to make its determinations that all parts have been sensed as present or absent.

It is yet another object of the present invention to provide a parts sensing device which can make the above described determinations even when a portion of its potential sensor sites are not in use.

Still another object of the present invention is to provide a parts sensing device which, when used in conjunction with extractor apparatus, can sense not only when all parts have been "gripped" by the extractor apparatus, but also when the parts have been successfully released by the extractor apparatus.

Still another object of the present invention is to provide a parts sensing device which utilizes individual parts sensors which are relatively inexpensive and can be easily and quickly removed and replaced.

Another object of the present invention is to provide a parts sensing device which is highly flexible in that the number and location of its individual sensor means can be quickly, easily and inexpensively altered to accommodate the special needs of parts forming industries such as the injection molding industry where the size and shape as well as the number of parts formed at each parts forming cycle are frequently changed.

It is yet another object of the present invention to provide a parts sensing device which provides a parts present or absent indicator for each sensor site as well as indicators to show whether all sensors are "on" or all sensors are "off".

Another object of the present invention is to provide a parts sensing device having an indicator means by which defective sensors can be identified.

It is yet another object of the present invention to provide a parts sensing device which requires only a relatively small number of connecting means from a control means to a display means and yet still has the capacity to provide at the display means an indicator for each sensor to show whether that sensor is "on" or "off".

SUMMARY OF THE INVENTION

To accomplish the objects of this invention a sensing device for use in conjunction with parts forming equipment is constructed having one or more optoelectronic sensors, a control means and indicator means. By optoelectronic sensor is meant a device whose (a) electrical conductivity, or (b) current sourcing capability varies as a function of the intensity or frequency of incident light. Examples of the first type include photoresistors, photodiodes and phototransistors. Examples of the second type include photovoltaic cells. Such a sensor may also include a light source such as a laser or LED (light emitting diode), and may further include appropriate lenses to reduce sensitivity to ambient light.

Each of the optoelectronic sensors is positioned at a convenient location either adjacent to or operably adjacent to parts being formed. For example, the sensors can be positioned on or in the mold or die tooling of the parts forming apparatus, or on the end effectors (the ends of the arm tooling which "grasp" the parts to be extracted) of the extractor means or at any other location which during the normal cycle of parts forming, extraction and deposition will bring the newly formed parts within the detection range of the sensors. Each sensor is then operably connected, usually by wiring, to the control means. The control means may be positioned on the extractor apparatus or at some other convenient location.

At some point during the parts forming cycle, and depending upon the location of the sensors, the newly fomed parts come within the detection range of the sensors and each sensor sends a signal to the control means that it "sees" its respective part. When the appropriate "seeing" signals are present from all the sensors, a decision is made by the control means that all sensors are "on", and an output signal is generated signifying an "ALL ON" condition. As the parts forming or extraction cycle continues the parts pass out of the detection range of the sensors and a signal is sent from each sensor to the control means that it no longer "sees" its respective part. At that point a second decision is made that all sensors are "off" and an output signal is generated signifying an "ALL OFF" condition. If, for any reason, either one or more parts are not sensed by the respective sensors, the "ALL ON" signal will not be generated; conversely, if all the parts do not pass out of the detection range of the sensors, the "ALL OFF" signal will not be generated.

The sensing device can be operably connected to the controls of the parts forming apparatus so that if either the "ALL ON" or "ALL OFF" signal is not generated at the appropriate time for such signal, the parts forming apparatus will be signaled not to proceed with its next step in the parts forming cycle. If, however, the "ALL ON" and "ALL OFF" signals are generated at their appropriate respective times, the parts forming equipment will be signaled to proceed in its parts forming cycle.

A first indicator or display means, which can be remotely positioned from the control means, indicates the results of the decisions reached by the control means and can show the "ALL ON" and "ALL OFF" status of the sensing device. In addition, the first indicator means can be operably connected to the controls of the parts forming equipment so that the "ALL ON" and "ALL OFF" signals received by the first indicator means are transmitted to the controls of the parts forming equipment. Furthermore, a second indicator or display means, which also can be remotely positioned, can include separate display means for each sensor channel, thereby providing a convenient means of determining which parts have not been sensed as present or absent or which sensor, if any, requires adjustment or replacement. The first and second indicator means can, of course, be embodied in the same apparatus.

The control means is designed to monitor a finite number of sensors. However, for the "ALL-ON" and "ALL-OFF" logic systems to function, it is not necessary that the maximum number of sensors be used (i.e., that all the sensor sites have sensors "plugged" into them). A built-in circuit and switch contacts within the control means automatically bypass unused sensor channels. It is only necessary that a sensor be connected to the sensor site of the master sensor channel, usually denoted channel one, which channel generates the bypass signal for the unused sensor channels. The unused sensor channels, therefore, carry an output signal derived from and functionally identical to the signal generated by the master sensor channel, while the sensor channels which have operating sensors installed in the sensor sites carry the signals generated oy their respective sensors and ciruuitry. Regardless of the number of sensors used (or "plugged" into sensor sites), all the display means on the second indicator means corresponding to unused sensor channels switch on or off approximately in unison with the master sensor channel display while the display means corresponding to the "in use" sensor channels follow the operation of their respective sensors.

If a sensor becomes defective, it prevents, depending on the types of defect, either an "ALL ON" or "ALL OFF" logic signal from being generated by the control means. In either way, it signals the controller of the parts forming equipment to not continue the parts formation and/or removal cycle. The defective sensor is easily identified by its respective indicator located on the second indicator means remaining either on or off while the indicators for the other sensors change when parts pass into or out of the detection ranges of their respective sensors during the cycle of parts formation, extraction and deposition. The defective sensor, once identified, can be simply unplugged from its sensor site and replaced with a nondefective sensor or, if a replacement sensor is not available, the sensor can be unplugged and the sensor site left empty. In the latter case, the sensing device can still function automatically with the control means still performing its "ALL-ON" and "ALL-OFF" decisions on the signals of all the sensor channels, but with the channel of the now empty (defective sensor) site carrying the bypass signals generated by the master sensor channel. Against the possibility that the sensor for the master channel becomes defective, provision is made to either assign another sensor channel to the master channel circuitry of the control means or replace the defective sensor of the master channel.

The sensing device also includes a multiplexing means which functions between the sensor channels and the second indicator means. The multiplexer transmits sequentially and cyclicly from the control means to the second indicator means signals derived from each of the sensors, resulting in reduced power required by the indicator means and a reduced number of connecting means, usually wires, from the control means to the second indicator means.

A preferred embodiment of the invention is to position the optoelectronic sensors on the end effectors or gripping means of the robotic part extractors used in conjunction with parts forming apparatus equipment, especially equipment for the injection molding of plastic parts. In such a use the extreme flexibility of the invention is apparent. Whenever a change in the numbers, sizes, or shapes of parts being formed is made, the sensors, if necessary, are easily repositioned to new positions on the appropriate end effectors of the extractor means so that the "gripped" parts are within the detection ranges of the sensors. If the number of parts to be sensed is changed, sensors are simply unplugged from the sensor sites where no part will be gripped and sensors are plugged into sensor sites where parts will be gripped.

In addition to being highly flexible, the device also has the advantage of requiring only minimal amounts of space. The control means can be mounted on the extractor means or some other convenient location and the second indicator means, with its separate displays for each sensor channel, placed at some convenient location for operator monitoring. The multiplexer feature assures that only a minimal number of connector means are needed from the control means to the second indicator means. Moreover, the sensors, while easily replaceable, are relatively inexpensive.

Other objects, features and advantages of the invention will be apparent from the following detailed description taken in conjunction with the accompanying drawings.

BRIEF DESCRIPTION OF THE DRAWINGS

The invention, as well as its objects and features will be better understood by reference to the following detailed description of the preferred embodiment of this invention taken in conjunction with the accompanying drawings in which.

DETAILED DESCRIPTION OF THE INVENTION

Figure 1:
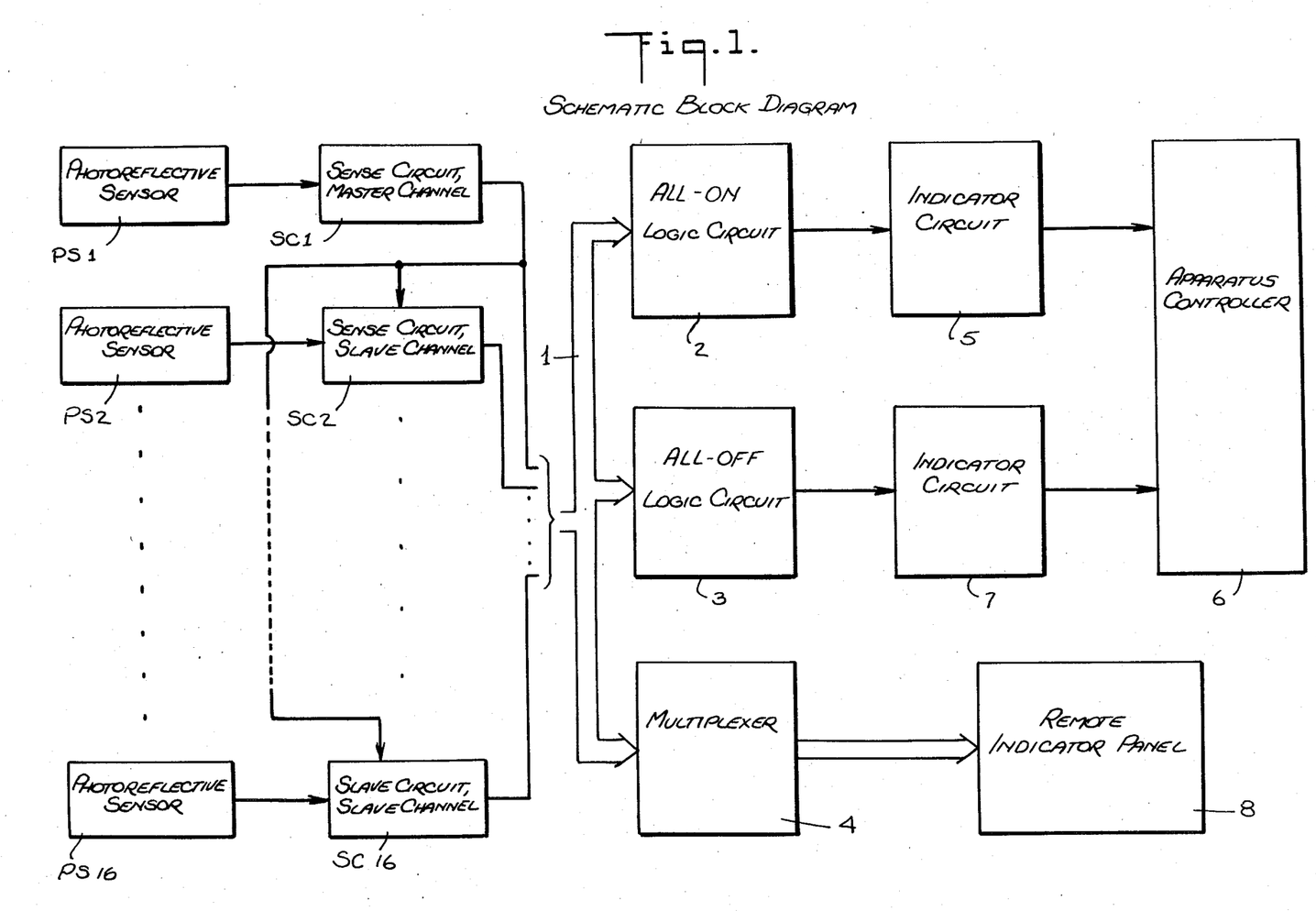
FIG. 1 is a schematic block diagram of the present invention.

Referring now to the drawings, specifically FIG. 1, there is shown a sensing device constructed according to the invention. The device comprises an array of 16 photoreflective sensors, PS1 through PS16, and 16 sense circuits, SC1 through SC16. Each photoreflective sensor is electrically connected to a different sense circuit. Each such sensor and sense circuit pair, called a channel, generates a digital electrical signal which indicates at any point in time whether an object is being sensed by the sensor. The signal generated by the first such channel, called the master channel, PS1 and SC1, is electrically connected to all other sense channels, called slave channels, so that in the event that a photoreflective sensor is not connected to a sense circuit of one of the slave channels, that sense circuit will generate an output signal functionally identical to the output of the master channel. The construction of the sense circuits will be described in detail below.

The outputs of the 16 sense circuits SC1 through SC 16 are each transmitted along a data path 1 to ALL-ON logic circuit 2, ALL-OFF logic circuit 3, and Multiplexer 4. The ALL-ON logic circuit 2 generates a digital electrical signal which indicates at any point in time whether, on the one hand, all the photoreflective sensors PS1 through PS16 which are in use are detecting objects or, on the other hand, at least one such sensor is not detecting any object. The ALL-OFF logic circuit 3 generates a digital electronic signal which indicates at any point in time whether, on the one hand, none of the photoreflective sensors PS1 through PS16 are detecting any object or, on the other hand, at least one of such sensors is detecting an object. The output of the ALL-ON logic circuit 2 is connected to an indicator circuit 5 which causes such output to be displayed visibly. The indicator circuit 5 also amplifies and inverts such output and transmits it to an apparatus controller 6. The output of the ALL-OFF logic circuit 3 is connected to an indicator circuit 7 which performs functions identical to that of the indicator circuit 5. The ALL-ON logic circuit 2, the ALL-OFF logic circuit 3, and the indicator circuits 5 and 7 will be described in detail below.

Figures 2, 3:
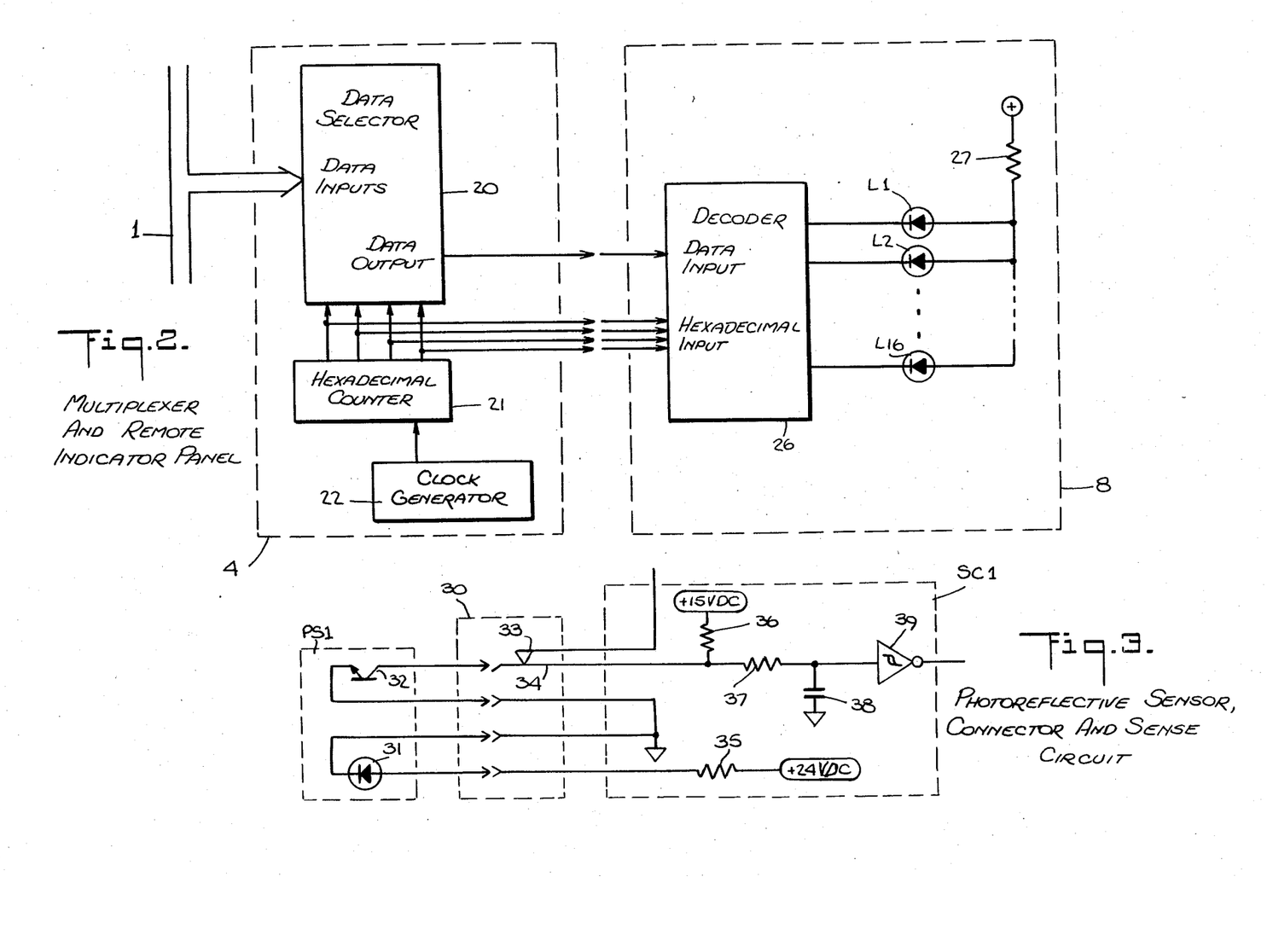
FIG. 2 is a schematic diagram of the multiplexer and remote indicator panel shown in FIG. 1.
FIG. 3 is a schematic diagram of a photoreflective sensor connector and sense circuit shown in FIG. 1.

The multiplexer 4 converts the outputs of the 16 sense circuits SC1 through SC16 into a sequence of digital signals. Referring to FIG. 2, such multiplexer comprises a data selector 20, a hexadecimal counter 21, and a clock generator 22. The clock generator 22 generates a sequence of pulses at a frequency of approximately 800 Hz. Those skilled in the art will recognize that a wide variety of circuits will accomplish this function. In addition, they will recognize that 800 Hz is merely a nominal figure and that the multiplexer 4 will operate at frequencies far above or below 800 Hz as well. The clock generator is connected to the hexadecimal counter 21 which, in response to the pulses from the clock generator, counts cyclicly from 0 to 15. The outputs of the counter 21 and the outputs of the 16 sense circuits SC1 through SC16 are all connected to the data selector 20. In response to the signal from the counter 21, the data selector selects the output of one of the sense circuits SC1 through SC16 and transmits that output inverted to the output of the multiplexer 4. In operation, the clock generator 22 generates a sequence of pulses which cause the counter 21 to count cyclicly from 0 to 15. In response to signals from the counter, the data selector 20 transmits to the output of the multiplexer 4 a sequence of signals corresponding to the outputs of the sense circuits SC1 through SC16, inverted, one at a time, in a cyclical order.

The outputs of the data selector 20 and the counter 21 are transmitted through a connector and a cable, both not shown, to a remote indicator panel 8. It can be seen that the remote indicator panel 8 comprises a decoder 26, a resistor 27, and 16 light emitting diodes (LEDs) L1 through L16. The outputs of tne multiplexer 4 are connected to the decoder 26 as follows The output terminal of the data selector 20 is connected to the data input terminal of the decoder 26, and the outputs of the hexadecimal counter 21 are connected to the hexadecimal input terminals of the decoder 26. The decoder has 16 outputs, each of which is connected to the cathode of a corresponding LED L1 through L16. The anodes of all such LEDs are all connected together and further connected to a first terminal of the resistor 27. A second terminal of the resistor 27 is connected to the positive terminal of a power supply (not shown). The power supply and the resistor 27 are chosen such that each LED L1 through L16 will be forward-biased and hence emit light only when the decoder 26 brings the corresponding output to a logic low level. In operation, the decoder 26 transmits the data input signal to one of the 16 outputs, hich output is chosen in response to the hexadecimal input. If the data input signal is at a low logic level, then the LED corresponding to the chosen output will emit light; otherwise it will not. The decoder maintains all other output terminals at a logic high level, causing the corresponding LEDs to remain dark.

The multiplexer 4 and the remote indicator panel 8 together constitute a multiplexed display circuit. In response to the output of the counter 22, the data selector 20 transmits to the decoder 25 in inverted form the output of each sensing circuit SC1 through SC16, seriatim. Also in response to the output of the counter 22, the decoder 26 causes the appropriate LED to visibly display the state of the signal received from the data selector 20. It should be noted that at most, only one of the LEDs L1 through L16 emit light at any given time, greatly reducing the current required by the display. It should be further noted that only five conductors are needed for transmitting the display information to the remote indicator panel, far less than the 16 which a non-multiplexed display would require.

FIG. 3 shows schematically a representative sense channel comprising photoreflective sensor PS1 coupled via a connector 30 to a sense circuit SC1. The sensor PS1 comprises an LED 31 aud a phototransistor 32. Both are mounted on an end effector or gripper arm, not shown, and positioned such that light from the LED 31 does not reach the phototransistor 32 unless a reflective object, such as a molded plastic part or other object, reflects such light to the phototransistor. The LED and phototransistor combination can be disposed in a single housing. In addition, the LED and phototransistor combination can include appropriate lenses and filters to reduce sensitivity to ambient light. The phototransistor 32 acts as a switch, permitting current flow only when light from LED 31 is being reflected into such phototransistor. Connector 30 comprises four conductors, one of which includes a switch contact 33 and a terminal 34. The terminal 34 is adapted to connect electrically to the collector of the phototransistor 32 when the photoreflective sensor PS1 is plugged into connector 30, and to switch contact 33 when the sensor is not plugged in.

The sensor circuit comprises a first resistor 35 connected at one end to a 24VDC power supply (not shown) and at the other end through connector 30 to the anode of LED 31. A second resistor 36 is connected at one end to a 15VDC power supply (not shown) and at the other end to connector terminal 34 and to one end of a third resistor 37. The other end of resistor 37 is connected to a first end of a capacitor 38 and to the input of a Schmitt Trigger inverter 39. A second end of capacitor 38 is connected to ground. The cathode of LED 31 and the emitter of phototransistor 32 are each connected through connector 30 to ground.

In operation, the 24VDC power supply causes the LED 31 to remain forward biased and therefore lit at all times. Resistor 35 limits the current which passes through LED 31. When no object is reflecting light from LED 31 to phototransistor 32, the phototransistor is in its "off" state, hence virtually no current passes through it. Under such circumstances, resistors 36 and 37 perform a "pull-up" function, causing a logic high signal to appear at the input terminal of inverter 39. The inverter further causes a logic low signal to appear at its output terminal. When an object is present near photoreflective sensor PS1 and reflects light from LED 31 into phototransistor 32, the phototransistor is in its "on" state. Current passes from the 15 VDC power supply through resistor 36, through the phototransistor 32 to ground. In such circumstances the voltage at the collector of phototransistor 32 is within a few tenths of a volt of ground, causing a logic low to appear at the input terminal of inverter 39. Inverter 39 further causes a logic high to appear at its output. The capacitor 38 smoothes the transition from low to high and from high to low at the input terminal of inverter 39. Inverter 39 has a Schmitt Trigger input such that smootn, gradual transitions at its input terminal will not cause indeterminate conditions within the inverter.

On a first photoreflective sensor, connector and sense circuit group, called the master channel, switch contact 33 remains unconnected. The output terminal of inverter 39 in such master channel is connected to the input terminal of a buffer inverter not shown. On all other sensor, connector and sense circuit groups, called slave channels, switch contact 33 is connected to the output terminal of such buffer inverter, not shown.

It will be obvious to those of ordinary skill in the art that other configurations will also suffice. For example, the photoreflective sensors PS1 through PS16 can, with appropriate changes in downstream circuits, be replaced by other photoreflective devices, such as one that senses an object blocking transmission of light (rather than reflecting light) from an LED to a photosensor.

Figure 4:
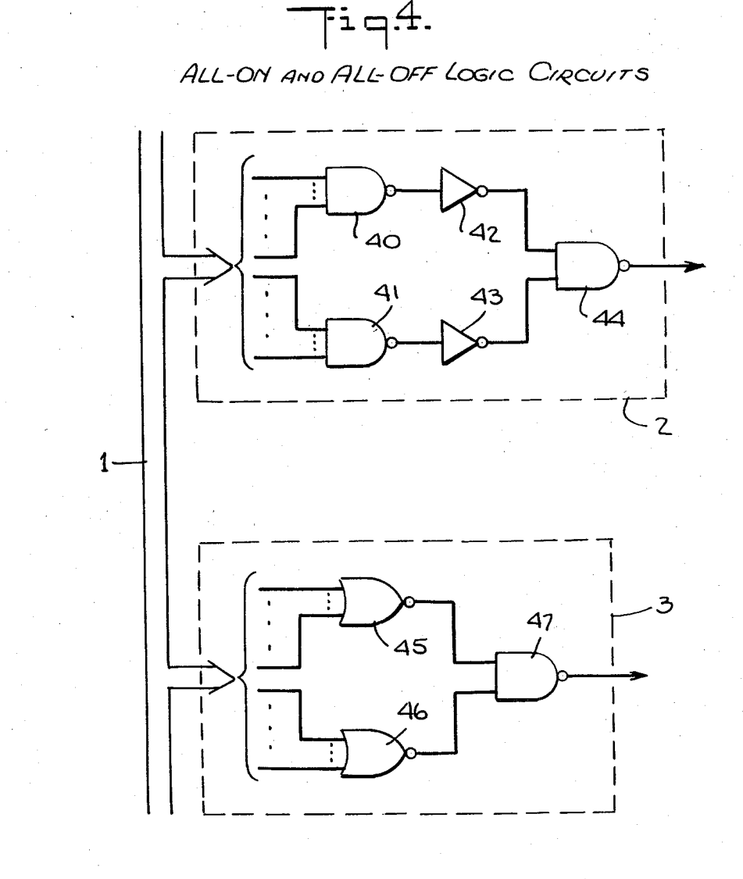
FIG. 4 is a schematic diagram of the ALL-ON and ALL-OFF logic circuits shown in FIG. 1.

FIG. 4 shows schematically ALL-ON logic circuit 2 and ALL-OFF logic circuit 3. The ALL-ON logic circuit 2 comprises a first 8-input NAND gate 40, a second 8-input NAND gate 41, a first inverter 42, a second inverter 43 and a 2-input NAND gate 44. Of the 16 signals on data path 1, eight are connected to eight corresponding inputs of NAND gate 40, and eight are connected to eight corresponding inputs of NAND gate 41. The output terminal of NAND gate 40 is connected to the input terminal of inverter 42, the output terminal of which is connected to a first input of NAND gate 44. The output terminal of NAND gate 41 is connected to the input terminal of inverter 43, the output terminal of which is connected to a second input of NAND gate 44. As previously mentioned, data path 1 comprises the output signals of the 16 sense circuits SC1 through SC16. When an object such as a plastic molded part is present near one of the device's photoreflective sensors, it reflects light from LED 31 to phototransistor 32, causing a logic high to appear at the output of the corresponding sense circuit. If no object is present, a logic low appears at such output. When a logic high appears at all eight of the sense circuit outputs which are connected to NAND gate 40, the output of inverter 42 will be a logic high; if at least one of such sense circuit outputs shows a logic low, the output of inverter 42 will be a logic low. Similarly, if a logic high appears at all eight of the sense circuit outputs which are connected to NAND gate 41, the output of inverter 43 will be a logic high; if at least one of such sense circuit outputs shows a logic low, the output of inverter 43 will be a logic low. Thus, a logic low will appear at the output of NAND gate 44 only if a logic high exists at the output of all 16 sense circuits SC1 through SC16; otherwise NAND gate 44 will generate a logic high. Since each sense circuit outputs a logic high only if the corresponding photoreflective sensor senses an object nearby, the output of NAND gate 44 will be a logic low if and only if all photoreflective sensors PS1 through PS16 sense objects nearby.

The ALL-OFF logic circuit 3 comprises a first 8-input NOR gate 45, a second 8-input NOR gate 46 and a 2-input NAND gate 47. Of the 16 signals on data path 1, eight are connected to eight corresponding inputs of NOR gate 45, and eight are connected to eight corresponding inputs of NOR gate 46. The output terminals of the NOR gates 45 and 46 are each connected to a corresponding input of NAND gate 47. When a logic low appears at all eight of the sense circuit outputs which are connected to NOR gate 45, a logic high appears at the output of such NOR gate. If at least one of such sense circuit outputs show a logic high, NOR gate 45 will generate a logic low. Similarly, when a logic low appears at all eight of the sense circuits which are connected to NOR gate 46, a logic high appears at the output of such NOR gate. If at least one of such sense circuit outputs show a logic high, NOR gate 46 will generate a logic low. NAND gate 47 will generate a logic low only if both of its inputs are at logic high; if either is at logic low, NAND gate 47 will generate a logic high. Thus, a logic low will appear at the output of NAND gate 47 only if a logic low exists at the output of all 16 sense circuits SC1 through SC16; otherwise NAND gate 47 will generate a logic high. Since each sense circuit outputs a logic low only if the corresponding photoreflective sensor senses no object nearby, the output of NAND gate 47 will be a logic low if and only if none of the photoreflective sensors PS1 through PS16 sense an object nearby.

Figure 5:
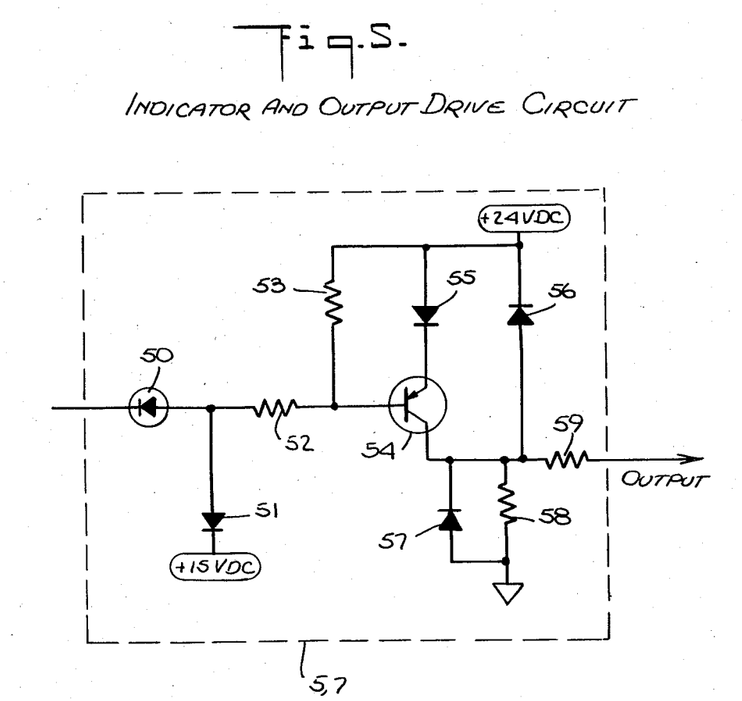
FIG. 5 is a schematic diagram of the indicator circuit and output drive shown in FIG. 1.

FIG. 5 shows schematically the indicator circuit 5. The output terminal of NAND gate 44 in the ALL-ON logic circuit shown in FIG. 4 is connected to the cathode of an LED 50. The anode of LED 50 is connected to the anode of a diode 51 and a first lead of a resistor 52. The cathode of diode 51 is connected to a 15VDC power supply (not shown). A second lead of resistor 52 is connected to a first lead of a resistor 53 and to the base of a PNP-type transistor 54. A second lead of rsistor 53 is connected to a 24VDC power supply (not shown), to the anode of a diode 55 and to the cathode of a diode 56. The cathode of diode 55 is connected to the emitter of transistor 54. The anode of diode 56 is connected to the collector of transistor 54, to the cathode of a diode 57, to a first lead of a resistor 58 and to a first lead of a resistor 59. The anode of diode 57 is connected to a second lead of resistor 58 and to ground. A second lead of resistor 59 constitutes the output of indicator circuit 5 and can be connected to the controller of the parts forming apparatus. In operation, diode 51 and the 15VDC power supply prevent the anode lead of LED 50 from ever exceeding approximately 15.7 Volts. When a logic high signal appears at the cathode of LED 50, the difference between the anode and cathode voltages of such LED is below the threshold required to permit current to flow therethrough. Thus, such LED remains dark and the voltage at its anode remains at approximately 15.7 volts. Resistors 52 and 53 are chosen so that under these circumstances the difference between the emitter and base lead voltages of transistor 54 is also below the threshold required to permit current to flow from such emitter to such base. Hence, no current flows from the emitter to the collector lead of the transistor. Resistor 58 acts as a "pull-down" resistor and causes the output of indicator circuit 5 to show a logic low. If, on the other hand, a logic low appears at the cathode of LED 50, the difference between the anode and cathode voltages of such LED will exceed the threshold voltage, causing current to flow therethrough. Thus, the LED emits light and clamps the voltage at its anode at approximately 2 volts. Under these circumstances diode 51 becomes reverse-biased and carries no current. Sufficient current flows through resistor 53 such that the emitter-base junction of transistor 54 becomes forward biased, thereby causing current to flow from the 24VDC power supply (not shown), through diode 55, through the emitter and collector junctions of transistor 54, through resistor 58 to ground. The collector of transistor 54 is therefore at a logic high, causing the output of indicator circuit 5 to show a logic high. Thus, taken in combination with the ALL-ON logic circuit 2, the indicator circuit 5 will cause LED 50 to emit light and will transmit a logic high to the apparatus controller 6 if and only if each of the photoreflective sensors PS1 through PS16 indicates that an object is within its sensing range.

The indicator circuit 7 is identical to the indicator circuit 5, with the exception that its input is connected to the output of ALL-OFF logic circuit 3, rather than to the output of ALL-ON logic circuit 2. Taken in combination with ALL-OFF logic circuit 3, the indicator circuit 7 will cause its LED 50 to emit light and will transmit a logic high to the apparatus controller 6 if and only if each of the photoreflective sensors PS1 through PS16 indicates that no object is within its sensing range. The diodes 51, 55, 56 and 57 and resistors 52, 53, 58, and 59 protect the transistor 54 and AND gates 44 and 47 (shown in FIG. 4) from excessive voltages.

The foregoing description of the invention should not be interpreted as limiting the invention to the specific embodiment described. It will be understood that numerous variations reside within the scope of the present invention. For example, several NAND gates may be placed in parallel with gates 44 and 47, respectively, to increase the drive capability of the sensing device. Furthermore, the resistors shown in FIGS. 1 through 5 can be adjustable resistors, so that circuit voltages can be fine tuned. Furthermore, it should be noted that positive logic may be used where the above embodiment uses negative logic, and that negative logic may be used where the above embodiment uses positive logic. In addition, it should be noted that the apparatus controller 6 shown in FIG. 1 is not essential and that a human operator may control the apparatus in response to the signals indicated through LEDs L1 through L16 (shown in FIG. 2) and the LED's of the ALL-ON and ALL-OFF indicatior circuits shown as the LED 50 in FIG. 5.

Furthermore, it should be noted that the number of sensor channels used in the above embodiment is not essential to the present invention and that circuits can be designed, within the scope of the invention, to accomodate a larger or smaller number of such channels. For example, eight input NAND gates 40 and 41 and eight input NOR gates 45 and 46 may be replaced by other NAND gates and NOR gates having a larger or smaller number of inputs and the capacity of the multiplexer means correspondingly altered.

An example of a specific embodiment of the above described invention is its use in conjunction with injection molding plastic parts forming apparatus.

With advanced injection molding apparatus it is possible to mold at one time a plurality of variously shaped and sized plastic parts. For the most efficient use of the injection molding machine the newly formed parts must be quickly removed from the respective mold bases and deposited outside the injection molding machine. To guard against damage to the mold assemblies and injection apparatus it is imperative that all the newly formed parts be removed from the mold bases before the molds are closed and another sequence of injection and parts formation begins.

The newly formd parts are removed from the mold bases by a robot extractor means which simultaneously grips each part, simultaneously removes each part from its respective mold base and finally releases each part, depositing the parts on outside apparatus.

In the practice of the above described invention, the optoelectronic sensors are clamped at convenient locations on the end effectors of the extractor means (the end effectors being the end of the arm tooling which "grasps" the parts to be extracted) so as to be adjacent to critical or difficult to remove molded parts and electrically connected to the control means which is embodied in a control box mounted on the extractor assembly.

This specific embodiment utilizes for its optoelectric sensors a phototransistor paired with an LED. It is preferred that the phototransistor and LED form a single unit or be disposed in the same housing. This type of sensor is particularly well suited to this specific use because of its relatively small size and the ease of positioning it at operable locations on the end effectors as well as the ease of removing and/or replacing sensors from individual sensor sites. Moreover, this type of sensor reliably detects the presence or absence of objects from the contacting point (where the sensed object is virtually touching the sensor) to over 1½ inches away from the sensor, thus allowing for the sensor to be positioned at a convenient location not hampering the operation of the extractor means.

During the extraction procedure when the end effectors grasp and remove the newly formed parts from the mold base, the parts come into the detection range of sensors and each sensor sends a signal to the control means that it "sees" its respective part. When the appropriate signals have been received from all the sensors, a logic decision is made that all parts have been removed and an output signal is generated signifying an "ALL ON" condition.

When all the parts have been released by the end effectors and deposited on outside apparatus, the parts pass out of the detection range of the sensors and each sends a signal to the control means that it no longer "sees" its respective part. At that time a second logic decision is made that all parts have been released and an output signal is generated signifying an "ALL OFF" condition. If for any reason either one or more parts are not in place (i.e. "gripped") when the gripping and removal occurs, then the "ALL ON" signal will not be generated; conversely, if all the parts are not released, then the "ALL OFF" signal will not be generated.

The output of the sensing device is operably connected to the controls of the injection molding equipment so that that equipment does not proceed with its next cycle of parts formation until both the "ALL-ON" and "ALL-OFF" signals have been generated. There is also an LED display for both the "ALL-ON" and "ALL-OFF" logic circuits which provides a visual display of the status of these circuits.

The sensing device also includes a conveniently located remote indicator panel which includes an LED indicator for each of the sensors. Each LED emits light when its respective sensor is "on" (i.e. "sees" a part) and does not emit light when its respective sensor is "off" (i.e. does not "see" a part). Should a part not be "gripped" or released by the extractor apparatus or a sensor malfunction and the "ALL ON" or "ALL OFF" signals consequently not be generated, the location of the "stuck" part or defective sensor can be quickly identified by reference to the remote indicator panel where the LED corresponding to the "stuck part" sensor or the defective sensor either remains "off" while those for the other sensors are "on" or remains "on" while those for the other sensors are "off".

The multiplexer feature of the invention provide that only a minimal number of electrical connectors is needed between the control means and the remote indicator panel. Moreover, the multiplexer feature greatly reduces the current required by the display of the indicator panel from that which would be required if the multiplexer were not used.

A feature of the current invention is its flexibility. Inasmuch as the molds of the injection molding apparatus are often changed to result in the production of different numbers, sizes and types of parts, the sensing device must have the capacity to easily adapt to sense the various combinations of parts which may be under production.

With a change in parts being produced, the small sensors can be easily repositioned at operable locations on the end effectors of the extractor means. If the ful sensor capacity of the control means is not needed, no special adjustments are necessary, the unneeded sensors are simply "unplugged" from their respective sensor sites and the sensing device automatically compensates for the unused sensor channels. The master channel, in conjunction with built in circuitry and switch contacts, generates a bypass signal for the unused channels, allowing "ALL ON" and "ALL OFF" logic decisions to be accurately made so long as the master channel is operating. The unused sensor channels then carry an output signal derived from and logically identical to the signal generated by the master sensor channel, while the sensor channels which have operating sensors installed in the sensor sites carry the signals generated by their respective sensors and circuitry. The ALL-ON and ALL-OFF logic circuits therefore can continue to function accurately, receiving the signals generated by each in use sensor channel and receiving from the unused sensor channels, signals derived from and logically identical to the signal generated by the master sensor channel.

For example, if all the in use sensors, including the master channel sensor, have sensed the presence of an object, each will generate an "on" signal which will be communicated to the control means. The unused sensor channels will, by effect of the bypass feature and because the master sensor channel is generating an "on" signal, similarly communicate "on" signals to the control means. The "ALL-ON" logic system "reads" these signals, determines that all senor channels are "on" and generates the "ALL-ON" signal.

If, however, any of the in use sensor channels did not sense an object and was therefore communicating an "off" signal to the control means, the "ALL-ON" signal would not be generated. Similarly, if the sensor of the master sensor channel did not sense an object, it would communicate an "off" signal which would also be communicated by each of the unused sensor channels and the "ALL-ON" signal would not be generated. Thus, the "ALL-ON" logic system continues to function accurately even when a portion of the sensor channels are not in use.

It will be understood that the "ALL-OFF" logic system similarly functions accurately when only a portion of the sensor sites are in use but of course it generates the "ALL-OFF" signal only when all the sensor channels are communicating "off" signals.

Should a sensor become defective during operation that sensor can be simply "unplugged" and the bypass feature of the invention automatically compensates for the unused channel.

While the present invention has been particularly described in terms of specific embodiments thereof, it will be understood that numerous variations are now enabled to those skilled in the art, which variations yet reside within the scope of the present invention. Accordingly, the invention is to be broadly construed, and limited only by the scope and spirit of the claims appended hereto.

What is claimed is:

1. A parts sensing device for sensing the presence of absence of newly formed parts, for use in conjunction with parts forming equipment, the parts sensing device comprising:
    (a) a plurality of optoelectronic sensors;
    (b) a plurality of sensor channels including one master sensor channel and a plurality of slave sensor channels;
    (c) a control means;
    wherein, each optoelectronic sensor is operably positioned to sense the presence or absence of one newly formed part and adapted to generate a signal indicating the presence or absence of the newly formed part, each optoelectronic sensor being connected to its own sensor channel,
    each sensor channel being operatively connected to the control means to transmit signals from the sensor channel to the control means,
    the master sensor channel having an optoelectronic sensor connected to it and functioning to transmit to the control means a signal derived from the signal generated by the optoelectronic sensor connected to the master sensor channel,
    each slave sensor channel further being operatively connected to the master sensor channel so that when no optoelectronic sensor is connected to a slave sensor channel the slave sensor channel transmits to the control means a signal derived from and functionally identical to the signal transmitted by the master sensor channel, and when an optoelectronic sensor is connected to a slave sensor channel the slave sensor channel transmits to the control means a signal derived from the signal generated by the optoelectronic sensor connected to the slave sensor channel,
    said control means functioning to do at least one of the following:
        (i) generate a signal indicating whether or not each of the optoelectronic sensors has sensed the presence of a newly formed part, and
        (ii) generate a signal indicating whether or not each ootoelectronic sensor has sensed the absence of a newly formed part;
    said signals generated by said control means being communicated to at least one of the following:
        (i) apparatus controlling the parts forming equipment, and
        (ii) a control means display, where said signals generated by the control means are displayed.

2. The parts sensing device of claim 1, further including a sensor channel display means, which sensor channel display means indicates the signals transmitted from a plurality of the sensor channels.

3. The parts sensing device of claim 2, further including a multiplexer means, said multiplexer means transmitting to the sensor channel display means signals received from a plurality of the sensor channels.

4. The parts sensing device of claim 1, wherein said control means comprises logic circuits.

5. The parts sensing device of claim 4 wherein said control means comprises at least one of (a) and (b) below:
    (a) at least two initial NAND means operably connected to at least one secondary NAND means which receives the output signals of the initial NAND means and which secondary NAND means is connected in its output to an output of the control means, and
    (b) at least two initial NOR means operably connected to at least one receiving NAND means which receives the output signals of the initial NOR means and which receiving NAND means is connected in its output to an output of the control means.

6. The parts sensing device of claim 4, wherein each said optoelectronic sensor comprises a photo transistor.

7. The parts sensing device of claim 4, wherein each of the optoelectronic sensors comprises an LED paired with a phototransistor, the LED and phototransistor pair being disposed in the same housing.

8. The parts sensing device of claim 7, wherein each of the optoelectronic sensors is disposed on an end effector of a robotic extractor which removes each newly formed part from the parts forming equipment before depositing it on another apparatus.

9. A parts sensing device for sensing the presence or absence of newly formed parts, for use in conjunction with parts forming equipment, the parts sensing device comprising:

(a) a plurality of optoelectronic sensor input sites, each site adapted to receive a signal generated by an optoelectronic sensor;

(b) a plurality of sensor channels including one master sensor channel and a plurality of slave sensor channels;

(c) a control means; wherein, each optoelectronic sensor input site is connected to its own sensor channel, each sensor channel being operatively connected to the control means to transmit signals from the sensor channel to the control means, each slave sensor channel further being operatively connected to the master sensor channel so that when no optoelectronic sensor is connected to the sensor input site of a slave sensor channel the slave sensor channel transmits to the control means a signal derived from and functionally identical to the signal transmitted by the master sensor channel, and when a optoelectronic sensor is connected to the sensor input site of a slave sensor channel the slave sensor channel trasmits to the control means a signal derived from the signal generated by the connected optoelectronic sensor, said control means functioning to do at least one of the following:

(1) generate a signal indicating whether or not the signals from each of the sensor channels indicate that the presence of a newly formed part has been sensed, and (2) generate a signal indicating whether or not the signals from each of the sensor channels indicate that the absence of a newly formed part has beed sensed;

said parts sensing device adapted to communicate the signals generated by said control means to at least one of the following:

(i) apparatus controlling the parts forming equipment, and (ii) a control means display, where said signals generated by the control means are displayed.

10. The parts sensing device of claim 9, further including a sensor channel display means, which sensor channel display means indicates the signals communicated from a plurality of the sensor channels.

11. The parts sensing deivce of claim 10, further including a multiplexer means, said multiplexer means transmitting to the senor channel display means signals received from a plurality of the sensor channels.

12. The parts sensing device of claim 11, wherein said control means comprises at least one of (a) and (b) below:

(a) at least two initial NAND means operably connected to at least one secondary NAND means which receives the output signals of the initial NAND means and which secondary NAND means is connected in its output to an output of the control means, and (b) at least two initial NOR means operably connected to at least one receiving NAND means which receives the output signals of the initial NOR means and which receiving NAND means is connected in its output to an output of the control means.

13. A method of sensing parts in conjunction with the operation of parts forming equipment, the method utilizing a plurality of optoelectronic sensors, each operably positioned to sense the presence of absence of at least one newly formed part, and a control means, the optoelectronic sensors generating a signal indicating the presence or absence of a part, said method comprising:

connecting one of the optoelectronic sensors to the control means by way of a master sensor channel and transmitting from said master sensor channel to the control means a signal corresponding to the signal generated by the optoelectronic sensor connected to the master sensor channel, connecting to the control means at least one slave sensor channel which optionally can be connected to an optoelectronic sensor with each slave sensor channel so configured that when no optoelectronic sensor is connected to the slave channel the slave channel transmits to the control means a signal derived from and functionally identical to the signal transmitted by the master sensor channel and when an optoelectronic sensor is connected to the slave sensor channel the slave sensor channel transmits to the control means a signal derived from the signal generated by the connected optoelectronic sensor, determining in the control means whether or not all sensor channels are transmitting signals indicating the presence of a part and communicating signals corresponding to the results of such determinations to apparatus controlling the parts forming equipment, determining in the control means whether or not all sensor channels are transmitting signals indicating the absence of a part and communicating signals corresponding to the results of such determinations to apparatus controlling the parts forming equipment.

14. The method of claim 13, which further includes displaying through a display means signals corresponding to the signals generated by each of a plurality of the sensor channels.

15. The method of claim 14, which further includes multiplexing signals from a plurality of the sensor channels to the display means.

16. The method of claim 15, further comprising making logic determinations whether all sensors are sensing the presence of parts and/or whether all sensors are sensing the absence of parts.

17. A parts sensing device for sensing the presence or absence of newly formed parts, for use in conjunction with an injection molding parts forming machine where newly formed parts are removed from their respective mold dies by being gripped by end effector mechanisms of a robotic extractor means, removed from the mold die and deposited by the robotic extractor means outside the mold dies, the parts sensing device comprising:

a plurality of optoelectronic sensors each disposed on an end effector of the robotic extractor means and operatively positioned to sense the presence of a newly formed part when the part is gripped by the end effector of the extractor means, each optoelectronic sensor adapted to generate a signal indicating the presence or absence of a newly formed part in the grip of the end effector on which the optoelectronic sensor is disposed, a plurality of sensor channels, with each optoelectronic sensor connected to a separate sensor channel, each optoelectronic sensor inputting to its respective sensor channel the signal generated by the optoelectronic sensor, each sensor channel operatively connected to a control means and adapted to transmit sensor channel signals from the sensor channel to the control means, the sensor channels including at least one master sensor channel and a plurality of slave sensor channels, each master sensor channel having an optoelectronic sensor connected to it and transmitting to the control means a sensor channel signal derived from the signal generated by the optoelectronic sensor connected to the master channel, each slave sensor channel operatively connected to the master sensor channel so that when no optoelectronic sensor is connected to a slave sensor channel the slave sensor channel transmits to the control means a sensor channel signal derived from and functionally identical to the sensor channel signal of the master sensor channel, and when an optoelectronic sensor is connected to a slave sensor channel the slave sensor channel transmits to the control means a sensor channel signal derived from the signal generated by the optoelectronic sensor connected to the slave sensor channel, said control means adapted to analyze the sensor channel signals it recieves to determine whether, and to generate a signal indicating that, all sensor channel signals indicate the presence of a part within the sensing range of the optoelectronic sensor from which the sensor channel receives a signal, said control means operatively connected to an apparatus which controls the parts forming machine so that if the control means determines at the point in time when the robotic extractor is to have grapsed the newly formed parts to be removed from the mold die that all sensor channels indicate that a pair has been sensed, the apparatus signals the parts forming machine to continue its operations and if the control means determines that at the point in time when the robotic extractor is to have grapsed the newly formed parts to be removed from the mold die not all sensor channels indicate that a part has been sensed, the apparatus signals the parts forming machine to discontinue its operations.

18. The parts sensing device of claim 17 wherein the control means is adapted to analyze the sensor channel signals it receives to determine whether, and to generate a signal indicating that, all sensor channels indicate the absence of a part within the sensing range of the optoelectronic sensor from which the sensor channel receives a signal, said control means operatively connected to an apparatus which controls the parts forming machine so that if the control means determines at a point in time when the robotic extractor means is intended to not be grapsing a part that all sensor channels indicate the absence of a part, the apparatus signals the parts forming machine to continue its operations, and if the control means determines that at a point in time when the robotic extractor means is intended to not be grasping a part that not all sensor channels indicate the absence of a part, the apparatus signals the parts forming machine to discontinue its operations.

19. The parts sensing device of claim 18, further including a control means display for indicating whether the control means has determined that all sensor channel signals indicate the presence of parts and for indicating whether the control means has determined that all sensor channel signals indicate the absence of parts.

20. The parts sensing device of claim 18, further including a sensor channel display means, which sensor channel display means indicates the sensor channel signals transmitted by a plurality of the sensor channels.

21. The parts sensing device of claim 20, further including a multiplexing means which transmits to the sensor channel display means sensor channel signals received from a plurality of the sensor channels.

22. The parts sensing device of claim 19, further including a sensor channel display means, which sensor channel display means indicates the sensor channel signals transmitted by a plurality of the sensor channels.

23. The parts sensing device of claim 22, further inlcuding a multiplexing means which transmits to the sensor channel display means sensor channel signals received from a plurality of the sensor channels.

24. The parts sensing device of claim 23, wherein each optoelectronic sensor comprises a photoreflective device having a light emitting source and a light sensing means.

25. The parts sensing device of claim 23, wherein each optoelectronic sensor comprises an LED paired with a phototransistor, the LED and phototransistor pair being disposed in the same housing.

26. The parts sensing device of claim 18, wherein each optoelectronic sensor comprises an LED paired with a phototransistor, the LED and phototransistor pair being disposed in the same housing.

27. A parts sensing device for sensing the presence and absence of newly formed parts for use in conjunction with injection molding parts forming equipment which produces parts in a parts molding cycle wherein, after each parts molding cycle, robotic transfer means having a plurality of grippers is used to transfer newly formed parts from the parts molding equipment to a secondary apparatus, and wherein the parts molding equipment is not to proceed with a next parts molding cycle unit the robotic transfer means has removed each newly formed part from the parts molding equipment the newly formed part to be deposited with the secondary apparatus, the parts sensing device comprising:

a plurality of photoreflective sensors each operably positioned on a gripper of the robotic transfer means to sense the presence or absence of a newly formed part in the grinoer, each photoreflective sensor connected to a control means through one of a plurality of sensor channels, the sensor channels comprising at least one master sensor channel and a plurality of slave sensor channels with the master channel so configured that it transmits to the control means a signal derived from the photoreflective sensor connected to the master sensor channel and each slave channel so configured that when a photoreflective sensor is conneted to the slave sensor channel it transmits to the control means a signal derived from the photoreflective sensor connected to the slave sensor channel and when no photoreflective sensor is connected to the slave sensor channel it transmits to the control means a signal derived from and functionally identical to the signal of a master sensor channel, the control means functioning to analyze the signals received from each sensor channel to determine at the time that the newly formed parts are to be grasped by the grippers of the robotic transfer means whether the signals received from all of the sensor channels indicate that a part has beed sensed by the photoreflective sensors of the sensing device, the control means functioning to analyze the signals received from each sensor channel to determine at the time that no parts are to be grasped by the grippers of the robotic transfer means whether the signals received from all of the sensor channels indicate that no part has been sensed by the photoreflective sensor of the sensing device.

the control means operably connected with the parts forming equipment so that the parts forming equipment does not proceed with its parts molding cycle unless at appropriate times in its cycle it receives signals from the control means that all sensor channels have indicated the presence of a part and that all sensor channels have indicated the absence of a part.

28. A parts sensing device for sensing the presence or absence of newly formed parts, for use in conjunction with parts forming equipment, the parts sensing device comprising:
(a) a plurality of sensors;
(b) a plurality of sensor channels including one master sensor channel and a plurality of slave sensor channels;
(c) a control means;
wherein, each sensor is operably positioned to sense the presence or absence of one newly formed part and adapted to generate a signal indicating the presence or absence of the newly formed part, each sensor being connected to its own sensor channel,
each sensor channel being operatively connected to the control means to transmit signals from the sensor channel to the control means,
the master sensor channel having a sensor connected to it and functioning to transmit to the control means a signal derived from the signal generated by the sensor connected to the master sensor channel,
each slave sensor channel further being operatively connected to the master sensor channel so that when no sensor is connected to a slave sensor channel the slave sensor channel transmits to the control means a signal derived from and functionally identical to the signal transmitted by the master sensor channel, and when a sensor is connected to a slave sensor channel the slave sensor channel transmits to the control means a signal derived from the signal generated by the sensor connected to the slave sensor channel,
said control means functioning to do at least one of the following:
(i) generate a signal indicating whether or not each of the sensors has sensed the presence of a newly formed part, and
(ii) generate a signal indicating whether or not each sensor has sensed the absence of a newly formed part,
said signals generated by said control means being communicated to at least one of the following:
(i) apparatus controlling the parts forming equipment, and
(ii) a control means display, where said signals generated by the control means are displayed.

29. The parts sensing device of claim 28, further including a sensor channel display means, which sensor channel display means indicates the signals transmitted from a plurality of the sensor channels.

30. The parts sensing device of claim 29, further including a multiplexer means, said multiplexer means transmitting to the sensor channel display means signals received from a plurality of the sensor channels.

31. The parts sensing device of claim 28, wherein said control means comprises logic circuits.

32. The parts sensing device of claim 31, wherein said control means comprises at least one of (a) and (b) below:
(a) at least two initial NAND means which operably connected to at least one secondary NAND means which receives the output signals of the initial NAND means and which secondary NAND means is connected in its output to an output of the control means, and
(b) at least two initial NOR means operably connected to at least one receiving NAND means which receives the output signals of the initial NOR means and which receiving NAND means is connected in its output to an output of the control means.

33. The parts sensing device of claim 31, wherein each of the sensors is disposed on an end effector of a robotic extractor which removes each newly formed part from the parts forming equipment before depositing it on another apparatus.

34. A parts sensing device for sensing the presence or absence of newly formed parts, for use in conjunction with parts forming equipment, the parts sensing device comprising:
(a) a plurality of sensor input sites, each site adapted to receive a signal generated by a sensor;
(b) a plurality of sensor channels including one master channel and a plurality of slave sensor channels;
(c) a control means;
wherein, each sensor input site is connected to its own sensor channel,
each sensor channel being operatively connected to the control means to transmit signals from the sensor channel to the control means,
each slave sensor channel further being operatively connected to the master sensor channel so that when no sensor is connected to the sensor input site of a slave sensor channel the slave sensor channel transmits to the control means a signal derived from and functionally identical to the signal transmitted by the master sensor channel, and when a sensor is connected to the sensor input site of a slave sensor chanel the slave sensor channel transmits to the control means a signal derived from the signal generated by the connected sensor,
said control means functioning to do at least one of the following:
(1) generate a signal indicating whether or not the signals from each of the sensor channels indicate that the presence of a newly formed part has been sensed, and
(2) generate a signal indicating whether or not the signals from each of the sensor channels indicate that the absence of a newly formed part has been sensed;

said parts sensing device adapted to communicate the signals generated by said control means to at least one of the following:
(i) apparatus controlling the parts forming equipment, and
(ii) a control means display, where said signals generated by the control means are displayed.

35. The parts sensing device of claim 34, further including a sensor channel display means, which sensor channel display means indicates the signals communicated from a plurality of the sensor channels.

36. The parts sensing device of claim 35, further including a multiplexer means, said multiplexer means transmitting to the sensor channel display means signals received from a plurality of the sensor channels.

37. The parts sensing device of claim 36, wherein said control means comprises at least one of (a) and (b) below:
(a) at least two initial NAND means operably connected to at least one secondary NAND means which receives the output signals of the initial NAND means and which secondary NAND means is connected in its output to an output of the control means, and
(b) at least two initial NOR means operably connected to at least one receiving NAND means which receives the output signals of the initial NOR means and which receiving NAND means is connected in its output to an output of the control means.

38. A method of sensing parts in conjunction with the operation of parts forming equipment, the method utilizing a plurality of sensors, each operably positioned to sense the presence or absence of at least one newly formed part, and a control means, the sensors generating a signal indicating the presence or absence of a part, said method comprising:
connecting one of the sensors to the control means by way of a master sensor channel and transmitting from said master sensor channel to the control means a signal corresponding to the signal generated by the sensor connected to the master sensor channel,
connecting to the control means at least one slave sensor channel which optionally can be connected to a sensor with each slave sensor channel so configured that when no sensor is connected to the slave channel the slave channel transmits to the control means a signal derived from and functionally identical to the signal transmitted by the master sensor channel and when a sensor is connected to the slave sensor channel the slave sensor channel transmits to the control means a signal derived from the signal generated by the connected sensor,
determining in the control means whether or not all sensor channels are transmitting signals indicating the presence of a part and communicating signals corresponding to the results of such determinations to apparatus controlling the parts forming equipment,
determining in the control means whether or not all sensor channels are transmitting signals indicating the absence of a part and communicating signals corresponding to the results of such determinations to apparatus controlling the parts forming equipment.

39. The method of claim 38, which further includes displaying through a display means signals corresponding to the signals generated by each of a plurality of the sensor channels.

40. The method of claim 39, which further includes multiplexing signals from a plurality of the sensor channels to the display means.

41. The method of claim 40, further comprising making logic determinations whether all sensors are sensing the presence of parts and/or whether all sensors are sensing the absence of parts.

42. A sensing device for sensing the presence or absence of objects, for use in conjunction with apparatus which interacts with the sensed objects, the sensing device comprising:
(a) a plurality of sensors;
(b) a plurality of sensor channels including one master sensor channel and a plurality of slave sensor channels;
(c) a control means;
wherein, each sensor is operably positioned to sense the presence or absence of one object and adapted to generate a signal indicating the presence or absence of the object, each sensor being connected to its own sensor channel,
each sensor channel being operatively connected to the control means to transmit signals from the sensor channel to the control means,
the master sensor channel having a sensor connected to it and functioning to transmit to the control means a signal derived from the signal generated by the sensor connected to the master sensor channel,
each slave sensor channel further being operatively connected to the master sensor channel so that when no sensor is connected to a slave sensor channel the slave sensor channel transmits to the control means a signal derived from and functionally identical to the signal transmitted by said master sensor channel, and when a sensor is connected to a slave sensor channel the slave sensor channel transmits to the control mans a signal derived from the signal generated by the sensor connected to the slave sensor channel,
said control means functioning to do at least one of the following:
(i) generate a signal indicating whether or not each of the sensors has sensed the presence of an object, and
(ii) generate a signal indicating whether or not each sensor has sensed the absence of an object,
said signals generated by said control means being communicated to at least one of the following:
(i) apparatus which interacts with the objects, and
(ii) a control means display, where said signals generated by the control means are displayed.

43. The sensing device of claim 42, further including a sensor channel display means, which sensor channel display means indicates the signals transmitted from a plurality of the sensor channels.

44. The sensing device of claim 43, further including a multiplexer means, said mulitplexer means transmitting to the sensor channel display means signals received from a plurality of the sensor channels.

45. The sensing device of claim 42, wherein said control means comprises logic circuits.

46. The sensing device of claim 45, wherein said control means comprises at least one of (a) and (b) below:
(a) at least two initial NAND means operably connected to at least one secondary NAND means which receives the output signals of the initial NAND means and which secondary NAND means is connected in its output to an output of the control means, and
(b) at least two initial NOR means operably connected to at least one receiving NAND means which receives the output signals of the initial NOR means and which receiving NAND means is connected in its output to an output of the control means.

47. The sensing device of claim 43, wherein said sensors comprise optoelectronic sensors.

48. The sensing device of claim 47, wherein each optoelectronic sensor comprises a phototransistor.

49. The sensing device of claim 47, wherein each optoelectronic sensor comprises an LED paired with a phototransistor, the LED and phototransistor pair being disposed in the same housing.

50. The sensing device of claim 46, wherein said sensors comprise optoelectronic sensors.

51. The sensing device of claim 50, wherein each optotelectronic sensor comprises a photo transistor.

52. The sensing device of claim 51, wherein each optoelectronic sensor comprises an LED paired with a phototransistor, the LED and phototransistor pair being disposed in the same housing.

53. The sensing device of claim 52, wherein each of the optoelectronic sensors is disposed on an end effector of a robotic apparatus which cyclicly interacts with objects to be sensed.

54. The sensing device of claim 42, wherein each of the sensors is disposed on an end effector of a robotic apparatus which cyclicly interacts with objects to be sensed.

55. The sensing device of claim 49, wherein each of the optoelectronic sensors is disposed on an end effector of a robotic apparatus which cyclicly interacts with objects to be sensed.

* * * * *